United States Patent [19]

Witzel

[11] Patent Number: 4,760,836
[45] Date of Patent: Aug. 2, 1988

[54] SPARK IGNITION SAFETY SYSTEM FOR A GAS BARBEQUE

[75] Inventor: Terrence R. Witzel, Waterloo, Canada

[73] Assignee: Onward Multi-Corp., Inc., Kitchener, Canada

[21] Appl. No.: 101,381

[22] Filed: Sep. 25, 1987

[51] Int. Cl.$^4$ .............................................. F24C 3/12
[52] U.S. Cl. ..................................... 126/42; 126/41 E; 126/39 E; 431/263; 431/264
[58] Field of Search ............... 126/42, 41 R, 39 R, 126/39 E, 39 BA; 431/263, 264, 266, 191

[56] References Cited

U.S. PATENT DOCUMENTS 2,726,653 12/1955 Strobel ................................ 126/42
4,441,480 4/1984 Rickman ............................. 126/42

FOREIGN PATENT DOCUMENTS 791253 2/1958 United Kingdom ............. 126/39 E
2180638 4/1987 United Kingdom ................. 126/42

Primary Examiner—James C. Yeung
Attorney, Agent, or Firm—Berman, Aisenberg & Platt

[57] ABSTRACT

A spark ignition safety system for a gas barbeque. The system comprises an external electrode secured to the bottom of the grill and positioned in proximity to a portion of the lid so that when the spark generator is actuated, a spark will be generated only externally when the lid is closed and only internally, through the normal internal spark generating electrode near the gas burner element, when the lid is open. The spark ingition safety system in accordance with the present invention minimizes the chance of the gas barbeque blowing up or catching on fire when an operator attempts to light the barbeque by manipulation of the spark generator without lifting the lid.

5 Claims, 2 Drawing Sheets

SPARK IGNITION SAFETY SYSTEM FOR A GAS BARBEQUE

BACKGROUND OF THE INVENTION

The present invention relates to a spark ignition safety system for a gas barbeque, and more particularly to a system for a gas barbeque which minimizes the chance of igniting the barbeque burner when the lid of the barbeque is in closed position.

Gas barbeques of the type to which the safety system of the present invention applies, have a bottom, generally made of cast aluminum, which bottom has a base with upstanding walls circumscribing the base. A lid, again usually made of cast aluminum, is hinged to the bottom to pivot between a closed position resting on the upper edges of the walls of the bottom to form an enclosed cooking chamber, and an open position. A gas burner element is supported on the base and a cooking grill is suspended over the burner element usually by appropriate support means on the walls of the bottom. Gas is fed to the burner element from a controllable gas source such as a canister. To start the barbeque, gas is fed to the burner element. An internal electrode, positioned within the bottom in proximity to the burner has a gap across which a spark passes to ignite this gas. An appropriate spark generator means, associated with the internal electrode by appropriate circuitry, produces the current which results in the spark when the spark generation means is appropriately manipulated by the operator.

One of the problems with such gas barbeques has been the danger of the barbeque blowing up or catching on fire if the operator tries to light the barbeque without lifting the lid. In such case, the cooking chamber, when the lid is in closed position, may fill with gas, particularly if the spark generation means does not immediately produce a spark across the gap of the internal electrode. Then, when a spark is ultimately generated, an explosion or unwanted fire may result.

It is an object of the present invention to provide a spark ignition safety system which addresses this problem of conventional gas barbeques.

SUMMARY OF THE INVENTION

In accordance with the present invention, a spark ignition safety system is provided for such a gas barbeque comprising a means electronically associated with the circuitry and mechanically associated with the lid to prevent a spark from being generated at the internal electrode when the lid is in closed position and permit such spark only when the lid is in open position.

In a preferred embodiment, the means comprises a second electrode secured externally to the barbeque, electronically associated with the spark generation means and mechanically associated with the lid and bottom so that a spark is only generated through this second electrode when the lid is in closed position and a spark is only generated through the internal electrode when the lid is in open position.

It will be readily appreciated that the spark ignition safety system in accordance with the present invention prevents a spark from being generated across the gap of the internal electrode unless and until the lid is in open position. When the lid is closed, either the spark is generated externally of the enclosed cooking chamber, causing the spark to be harmlessly grounded externally in the first preferred embodiment referred to above, or, in alternative embodiment, the switch in the circuit between the spark generation means and the internal electrode is in open position preventing a current from reaching the internal electrode. In both cases, the chance of an unwanted fire or explosion is significantly reduced or eliminated.

BRIEF DESCRIPTION OF THE DRAWINGS

These and other objects and advantages of the invention will become apparent upon reading the following detailed description and upon referring to the drawings in which.

Figure 1:
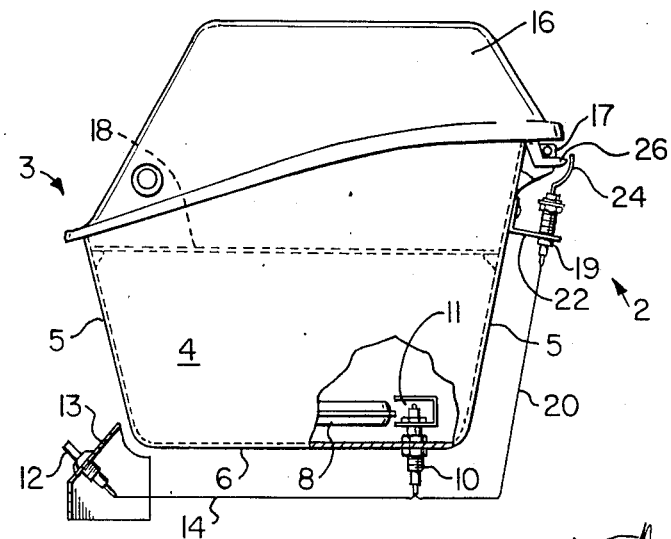
FIG. 1 is a side partial view of a gas barbeque having a spark ignition safety system in accordance with the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Figure 2:
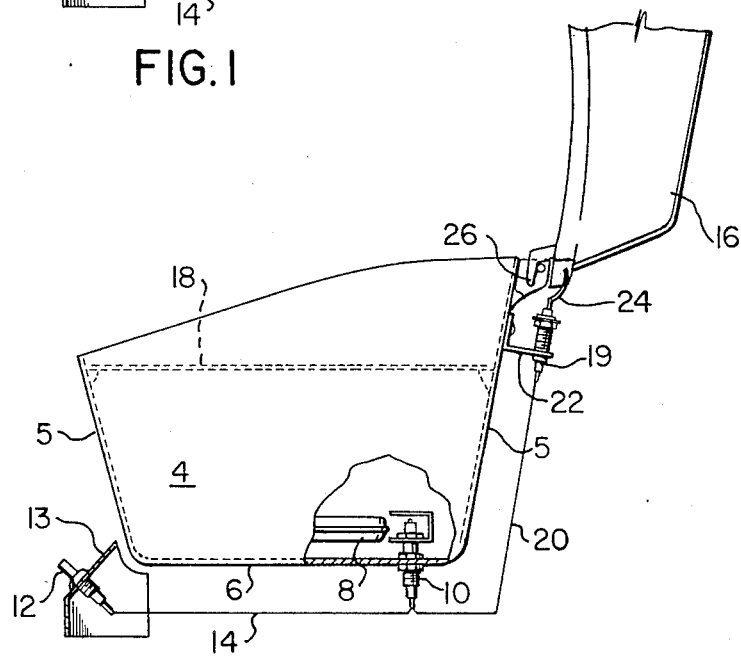
FIG. 2 is a side partial view, of the barbeque of FIG. 1 with the lid in open position.
Figure 3:
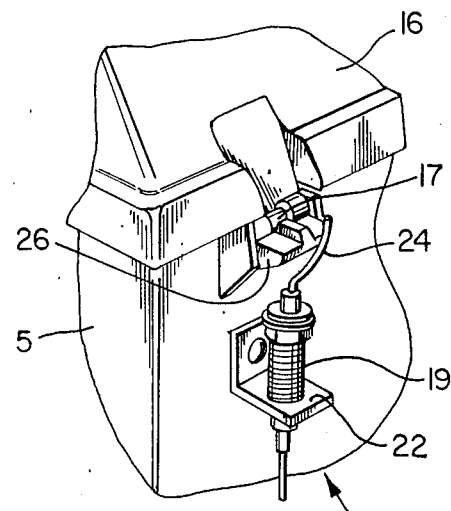
FIG. 3 is a partial perspective detail view of a portion of the system of FIG. 1.

Turning to the embodiment of the present invention illustrated in FIGS. 1, 2 and 3, there is provided a spark ignition safety system 2 mounted externally on a gas barbeque 3, the barbeque having a conventional bottom casting 4 made up of upstanding walls 5 circumscribing a base 6. On base 6 is supported a gas-receiving burner element 8 which element receives gas from a controllable source (not illustrated). To light the burner element 8 when gas is initially fed to it from the source, an electrode 10 provided with a gap 11 across which a spark will jump, is mounted on base 6, the gap 11 being in close proximity to the burner element 8. To generate a spark across gap 11, a conventional push-button ignitor 12 or the like is provided on front control panel 13 with appropriate circuitry 14 extending between push-button ignitor 12 and internal electrode 10.

An appropriate lid 16 is pivotally secured by hinge 17 to bottom 4 to pivot between closed position resting on the upper edges of walls 5 of bottom 4 (FIG. 1) to form an enclosed cooking chamber, and an open position (FIG. 2) in which the cooking chamber and cooking grill 18, suspended over burner element 8 by appropriate wall mounted support means, or the like, is exposed to view.

As can be seen particularly in FIG. 1, the spark ignition safety system 2 of this embodiment comprises an electrode 19 which is connected in series with electrode 10 and push-button ignitor 12. Electrode 19 however is externally mounted on one of the sides 5 of bottom 4 as illustrated, by means of a bracket 22. A contact 24 from electrode 19 is curved to provide a predetermined spacing, with respect to the proximal surface of confronting end of a flange 26 which is secured to lid 16 in the vicinity of hinge 17. Contact 24 is curved in such a manner that the distance between that surface of the end of flange 26 and contact 24 is less than the space of gap 11 of electrode 10 when the lid is in closed position and when the lid is being opened. For example, this distance may be approximately ⅛ of an inch while the gap 11 of electrode 10 may be ¼ of an inch. As lid 16 is moved from closed position to open position, flange 26 swings downwardly with the motion of lid 16 until, when the lid is in open position as illustrated in FIG. 2, the extremity of flange 26, as well as any proximal portion of barbeque lid 16, becomes spaced from the nearest point of contact 24 by, for example, at least ½ of an inch.

With this construction, it will be understood that when push-button ignitor 12 is actuated to generate a spark, current travelling along circuit 14 will produce a spark at electrode 19 because of the smaller gap between flange 26 and contact 24 of that electrode than gap 11, when barbeque lid 16 is in closed position or is in the process of being opened. Conversely, when the lid is open as illustrated in FIG. 2, actuation of ignitor 12 will cause the spark to pass only through gap 11 of electrode 10, since that gap now provides less of a space than the space between contact 24 of electrode 19 and the nearest portion of lid 16 or flange 26.

Figure 4:
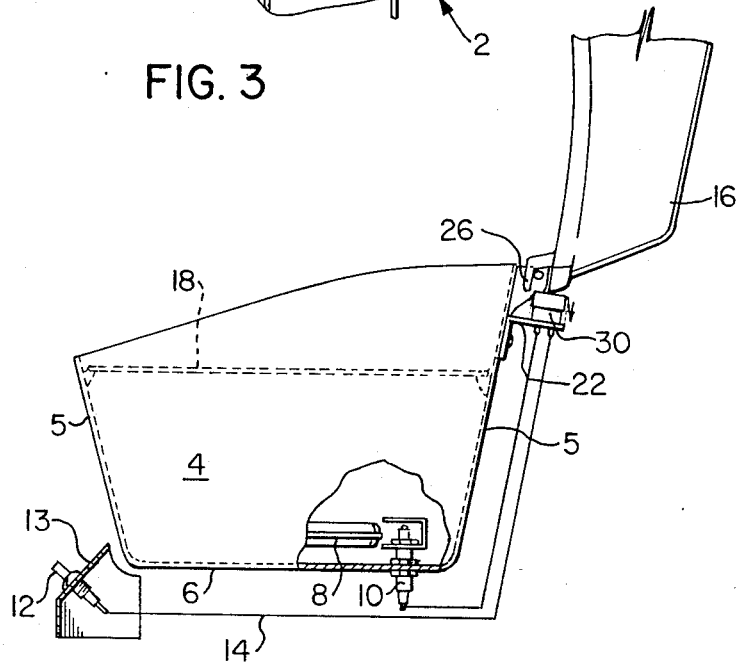
FIG. 4 is a schematic side partial view of a spark ignition safety system on a gas barbeque having an alternative embodiment of spark ignition safety system in accordance with the present invention.

In the embodiment of FIG. 4, instead of an electrode 19, spark ignition safety system 2 is provided by way of a switch 30 in circuitry 14 between push-button ignitor 12 and electrode 10. This switch is mechanically operated by opening and closing barbeque lid 16, switch 30 being in closed position completing circuit 14 when the lid is in open position, as illustrated, and switch 30 being caused to be in open position, breaking circuit 14, when lid 16 is in closed position. Of course, in this latter instance, actuation of push-button ignitor 12 will prevent any spark from being generated through internal electrode 10.

In both of the illustrated embodiments, the barbeque ignitor will consequently not operate with the lid closed. It will only operate with the lid open, thus preventing or minimizing the chance of an explosion when the barbeque is first ignited.

Thus it is apparent that there has been provided in accordance with the invention a spark ignition safety system for a gas barbeque that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a gas barbeque comprising a bottom casting having a base and upstanding walls circumscribing the base, an electrically conductive lid pivotally hinged thereto to pivot between closed position resting on the upper edges of the walls of the bottom to form an enclosed cooking chamber, and open position, a gas burner element supported on the base and an internal electrode positioned within the bottom in proximity to the burner element for generating a spark across a gap in the electrode and igniting gas fed to the burner element and a spark generation means electronically associated by means of appropriate circuitry electronically associated with the electrode to cause the electrode to spark when the spark generation means is manipulated by an operator, the improvement characterized by the barbeque being provided with a spark ignition safety system comprising a second electrode secured externally to the barbeque, electronically associated with the spark generation means and mechanically associated with the lid and bottom so that a spark is only generated through this second electrode when the lid is in closed position and a spark is only generated through the internal electrode when the lid is in open position.

2. A gas barbeque according to claim 1 wherein the second electrode is secured to the bottom of the barbeque externally of the bottom walls.

3. A gas barbeque according to claim 2 wherein a contact means is associated with the second electrode and positioned with respect to a portion of the barbeque lid so as to be in closer proximity to that portion of the lid than the distance of the gap of the first electrode, to thereby produce a spark at the contact means of this second electrode when the lid is closed and the spark generation means is actuated, and to be a distance greater from that or any other portion of the lid than the distance of the gap of the first electrode to thereby produce a spark across the gap of the internal electrode when the spark generation means is actuated with the lid in open position.

4. A gas barbeque according to claim 3 wherein the electrically conductive flange is secured to the lid and the surface of the flange proximal to the contact means is spaced a predetermined distance from the contact means, when the barbeque lid is in closed position, which distance is less than that of the gap of the first electrode, the surface of the flange proximal to the contact means lying a predetermined greater distance from the contact means, when the lid is in open position, which distance is greater than that of the gap of the first electrode.

5. A gas barbeque according to claim 4 wherein the contact means is an extension of the electrode, which extension is curved so that it lies a predetermined distance from the flange when the lid is in closed position and a predetermined greater distance from the flange when the lid is in open position.

* * * * *